(12) United States Patent
Liu et al.

(10) Patent No.: US 11,458,517 B2
(45) Date of Patent: Oct. 4, 2022

(54) MICROWAVE CURING DEVICE FOR BEACH FACE OF URANIUM TAILINGS POND

(71) Applicant: University of South China, Hengyang (CN)

(72) Inventors: Yong Liu, Hengyang (CN); Keyou Shi, Hengyang (CN); Qiucai Zhang, Hengyang (CN); Xiangyang Li, Hengyang (CN); Guowen Peng, Hengyang (CN); Zhenghua Xu, Hengyang (CN); Xiuwu Yu, Hengyang (CN); Changshou Hong, Hengyang (CN); Fuliang Jiang, Hengyang (CN); Yifan Chen, Hengyang (CN); Wei Wei, Hengyang (CN)

(73) Assignee: University of South China

( * ) Notice: Subject to any disclaimer, the term of this patent is extended or adjusted under 35 U.S.C. 154(b) by 293 days.

(21) Appl. No.: 16/941,056

(22) Filed: Jul. 28, 2020

(65) Prior Publication Data
US 2021/0031248 A1 Feb. 4, 2021

(30) Foreign Application Priority Data
Jul. 31, 2019 (CN) .......................... 201910701224.8

(51) Int. Cl.
*B09B 3/25* (2022.01)
*B09B 5/00* (2006.01)
*G21F 9/30* (2006.01)
*B09B 3/40* (2022.01)

(52) U.S. Cl.
CPC .................. *B09B 3/25* (2022.01); *B09B 3/40* (2022.01); *B09B 5/00* (2013.01); *G21F 9/30* (2013.01)

(58) Field of Classification Search
CPC .... B09B 3/25; B09B 3/40; B09B 5/00; G21F 9/30
USPC ............................................................. 588/1
See application file for complete search history.

(56) References Cited

U.S. PATENT DOCUMENTS

2011/0224473 A1 9/2011 Denton

FOREIGN PATENT DOCUMENTS

CN 102844819 B 1/2016

*Primary Examiner* — Edward M Johnson
(74) *Attorney, Agent, or Firm* — Lerner, David, Littenberg, Krumholz & Mentlik, LLP

(57) ABSTRACT

The present invention relates to a device for integrally processing a housing of a Computing, Communication, and Consumer (3C) product. The device includes a loading frame and an upper frame, where a material receiving device is arranged in the loading frame, a width of the loading frame is greater than that of the housing, a grinding device is arranged below the upper frame, and the grinding device includes a grinding movement device; the grinding movement device is connected to a grinding installation block, an outer side of the grinding installation block is provided with grinding lifting balls, a grinding arc block is embedded in an inner side of an upper portion of the grinding installation block, and the upper frame is also provided with a material pressing device. An outer side of the loading frame is provided with a feeding and discharging device.

10 Claims, 2 Drawing Sheets

MICROWAVE CURING DEVICE FOR BEACH FACE OF URANIUM TAILINGS POND

CROSS REFERENCE TO RELATED APPLICATIONS

This application claims priority from Chinese application number 201910701224.8, filed Jul. 31, 2019, the disclosure of which is hereby incorporated herein by reference.

TECHNICAL FIELD

The present invention relates to microwave treatment equipment for beach faces of uranium tailings ponds, and in particular, to a microwave curing device for a beach face of a uranium tailings pond.

BACKGROUND

In the 21$^{st}$ century, energy shortage and environmental pollution have become two major problems. As a cost-effective, clean and safe energy source, nuclear energy is considered one of the greatest achievements of mankind. The successful use of nuclear energy marks the arrival of a new energy era, and has become an important indicator of a country's comprehensive strength. However, with the rapid development of nuclear technology, the development of uranium resources has also increased rapidly, and a large amount of uranium tailings are inevitably produced after the smelting and purification of uranium resources. According to statistics, the total amount of uranium tailings in the world has reached 30 billion tons. Uranium tailings contain radioactive substances such as $^{238}$U, $^{234}$U, $^{230}$Th, $^{226}$Ra, $^{222}$Rn, $^{210}$Po and $^{210}$Pb, and usually have a radioactivity of n×10$^5$ Bq/kg. On a deposited beach face, the radiation absorbed dose of γ is usually n×10$^{-6}$ Gy/h, and the average $^{222}$Rn release rate is about 3.25-9.85 Bq/(m$^2$·s). Most of the radioactive substances contained in uranium tailings are long-lived nuclides, and their potential comprehensive impact can last for hundreds of thousands of years. At present, most uranium tailings ponds are out of service or going to be out of service. The management of these tailings ponds will directly affect the their safety as well as their surrounding environments. How to isolate radioactive waste from our environments stably and safely for a long time becomes the most important task in the safety management of uranium tailings ponds.

At present, countries around the world have done a lot in the environmental management of uranium tailings ponds out of service and have achieved many effective results. For example, for the beach face treatment of tailings ponds at home and abroad, materials such as soil and asphalt are mainly used to cover exposed tailings, so as to reduce the diffusion of pollutants in the tailings leachate and effectively enclose the tailings in the tailings pond. In recent years, curing agents such as resins and electrolyte solutions are added to a cover layer of tailings, so as to improve the treatment effect of the cover layer and control the γ radiation and $^{222}$Rn release. However, for places with long rainy seasons and heavy precipitation, the above methods are not effective, and some of the treated tailings pond beach faces have lost their protective effect.

An invention patent, with a publication number of CN102844819B, introduces a microwave enhancement system, method and equipment for pyrolysis and vitrification of a radioactive substance. The system performs pyrolysis and vitrification by a combination of microwave heating and induction heating to reduce the volume of radioactive waste. A microwave heating device of the invention includes a microwave source, a waveguide device and a tank. The invention is suitable for pyrolyzing and liquefying solid radioactive waste for the purpose of stabilizing the waste for safe storage and disposal. The number of layers of solid waste received and treated by the system is limited by the size of the tank. When the treatment of the solid waste settled in the tank is completed, the tank needs to be sealed and stored or disposed according to appropriate regulations. Therefore, the equipment is not suitable for the management of a large-area beach face of tailings ponds.

SUMMARY

In view of the above-mentioned shortcomings of the prior art, an objective of the present invention is to provide a microwave curing device for a beach face of a uranium tailings pond. A microwave heating system is used to microwave-cure the beach face of the uranium tailings pond. A lifting device is moved up and down to position a bell-mouthed feed port above the beach face to be cured, making an edge of the bell-mouthed feed port contact the beach face. A tail gas treatment system collects, treats and discharges tail gas generated during microwave curing and sintering. A power supply system controls an external power supply to make a microwave generator output microwave energy to heat and melt the beach face of the uranium tailings pond. A moving device controls the whole equipment to move to the beach face to be treated. When the beach face of the uranium tailings pond is microwave-treated, a surface microwave heating system and a deep microwave heating system cure the beach face of the uranium tailings pond layer by layer (from deep to shallow and from surface to deep) from different directions (horizontally and longitudinally). Finally, the entire beach face is sintered, and the capacity thereof is reduced by sintering.

The present invention is implemented by the following technical solutions.

A microwave curing device for a beach face of a uranium tailings pond, including a microwave heating system for sintering and curing uranium tailings on the beach face at high temperature. The microwave heating system includes a microwave generator, a microwave control cabinet, a waveguide, a bell-mouthed feed port and a support plate. The microwave generator is fixed on the support plate and electrically connected to the microwave control cabinet. The bell-mouthed feed port is connected to the microwave generator through the waveguide. The bell-mouthed feed port is arranged at one end of the waveguide. When the bell-mouthed feed port is arranged on an inner layer or a surface layer of the beach face of the uranium tailings pond, microwave generated by the microwave generator is transmitted to the inner layer or the surface layer of the beach face of the uranium tailings pond through the waveguide to microwave-sinter and cure the uranium tailings.

Further, the device includes: a lifting device, a tail gas treatment system, a power supply system and a moving device. The microwave heating system is fixedly connected to the lifting device through the support plate. The lifting device is rotatably arranged on the moving device. The tail gas treatment system and the power supply system are fixed on the moving device. The microwave heating system, the lifting device, the tail gas treatment system and the moving device are all electrically connected to the power supply system.

Further, a shell of the bell-mouthed feed port is provided with an infrared temperature measurement and protection device, a water vapor extraction interface and a waste gas extraction interface. The tail gas treatment system is connected to the waste gas extraction interface through a tube to extract tail gas generated during microwave sintering and curing to the tail gas treatment system for purification. The water vapor extraction interface is connected to a cooling water or circulating water cooling system. The infrared temperature measurement and protection device is mounted between the microwave generator and the waveguide.

Further, the lifting device includes: a lifting arm mounting base, a first lifting arm, a first cylinder, a second lifting arm, a second cylinder, a third lifting arm and a third cylinder. The lifting arm mounting base is horizontally rotatably fixed on the moving device. The lifting arm mounting base, the first lifting arm, the second lifting arm and the third lifting arm are hinged in order. The first cylinder is arranged on a lower side of the first lifting arm and is hinged with the lifting arm mounting base and the first lifting arm, respectively. The second cylinder is arranged on a lower side of the first lifting arm and is hinged with the first lifting arm and the second lifting arm, respectively. The third cylinder is arranged on an upper side of the second lifting arm, and is hinged with the second lifting arm and the third lifting arm, respectively.

Further, the microwave generator has an output power of 75-100 KW.

Further, a bell mouth of the bell-mouthed feed port is rectangular, and the bell mouth has a size of 1 m×1 m to 1 m×2 m.

Further, the bell mouth of the bell-mouthed feed port is circular, and a diameter of the bell mouth is reduced to 30-50 cm.

Further, the moving device is a crawler type anti-radiation loader, which has a good anti-radiation performance. The crawler type anti-radiation loader is provided with an alarm system, which can automatically alarm in case of an equipment over temperature failure, magnetron over temperature failure and microwave system failure, etc.

Further, the tail gas treatment system uses a water filtration and activated carbon adsorption device.

Further, a metal mesh cover is arranged in a circumferential direction of the bell-mouthed feed port, which can effectively prevent microwave leakage.

Compared with the prior art, the present invention has the following beneficial effects.

1. In the present invention, when the beach face of the uranium tailings pond is microwave-treated, it is not necessary to detect a radioactive substance of the beach face of the uranium tailings pond. Instead, the microwave heating system directly microwave-cures the beach face of the uranium tailings pond layer by layer (from deep to shallow and from surface to deep) from different directions (horizontally and longitudinally). Finally, the entire beach face is sintered, and the capacity thereof is reduced by sintering.

2. In the present invention, when the beach face of the uranium tailings pond is microwave-cured, the microwave heating system includes a surface microwave heating system and a deep microwave heating system. The surface microwave heating system is used for surface microwave curing of the beach face of the uranium tailings pond. At this time, the bell-mouthed feed port adopts a square shape, which is convenient for enclosing the entire surface when sintering in a large area. A previous sintering surface is closely connected to a next sintering surface to avoid a gap not sintered between the two sintering surfaces. The deep microwave heating system is used for deep microwave curing of the beach face of the uranium tailings pond. At this time, the bell-mouthed feed port adopts a circular shape to sinter the deep of the beach face of the uranium tailings pond by drilling a hole and laying out a point. In this way, the sintering of the surface and deep of the beach face of the uranium tailings pond is achieved. Finally, the entire beach face is sintered, and the treatment effect is good.

3. The device of the present invention adopts a microwave heating method, which is different from a traditional heating method. The microwave heating method raises the temperature of a material by utilizing a high-frequency reciprocating motion of a dipole molecule inside a heated body to generate "internal friction heat". The inside and outside of the material can be heated at the same time without any heat conduction process, and the heating is fast and uniform. A heating purpose can be achieved by only a small fraction of energy consumption of the traditional heating method. Therefore, the microwave heating method has the characteristics such as fast-speed heating, short-time sintering, timely control, sensitive response, strong penetration, high energy utilization rate and less secondary waste. Compared with the conventional sintering process, the microwave sintering has great advantages in increasing material density, improving the microstructure, improving material properties, and saving investment, etc.

Figure 1:
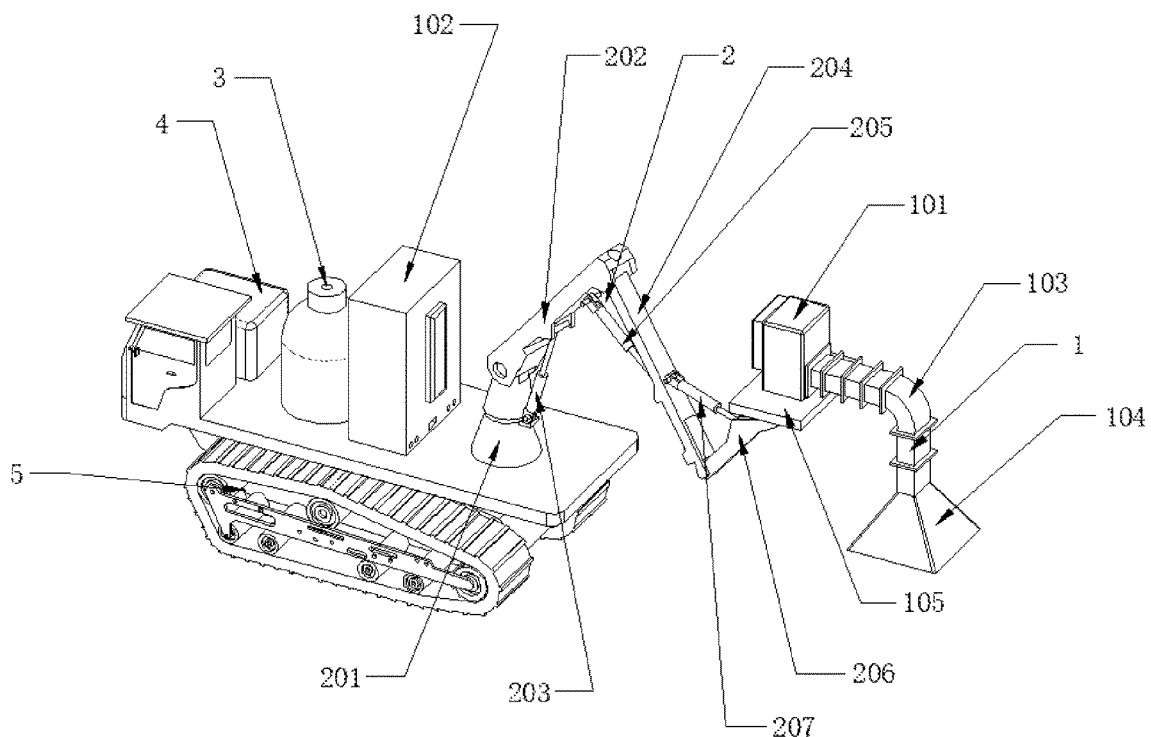
FIG. 1 is a schematic structural diagram of Embodiment 1 of a microwave curing device for a beach face of a uranium tailings pond according to the present invention.

In the FIG. 1. microwave heating system; 101. microwave generator; 102. microwave control cabinet; 103. waveguide; 104. bell-mouthed feed port; 105. support plate; 2. lifting device; 201. lifting arm mounting base; 202. first lifting arm; 203. first cylinder; 204. second lifting arm; 205. second cylinder; 206. third lifting arm; 207. third cylinder; 3. tail gas treatment system; 4. power supply system; and 5. moving device.

DETAILED DESCRIPTION

The technical solutions in the embodiments of the present invention are clearly and completely described below with reference to the accompanying drawings. Apparently, the described embodiments are merely a part rather than all of the embodiments of the present invention. All other embodiments obtained by a person of ordinary skill in the art based on the embodiments of the present invention without creative efforts should fall within the protection scope of the present invention.

The present invention is described in more detail below with reference to specific embodiments and accompanying drawings.

Embodiment 1

Referring to FIG. 1, a microwave curing device for a beach face of a uranium tailings pond includes a microwave heating system 1, a lifting device 2, a tail gas treatment system 3, a power supply system 4 and a moving device 5. The microwave heating system 1 is fixedly connected to the lifting device 2 through a support plate 105. The lifting device 2 is rotatably arranged on the moving device 5. The tail gas treatment system 3 and the power supply system 4 are fixed on the moving device 5. The microwave heating system 1, the lifting device 2, the tail gas treatment system 3 and the moving device 5 are all electrically connected to the power supply system 4.

As shown in FIG. 1, the microwave heating system 1 includes a microwave generator 101, a microwave control cabinet 102, a waveguide 103, a bell-mouthed feed port 104 and the support plate 105. The microwave generator 101 is fixed on the support plate 105 and electrically connected to the microwave control cabinet 102. The bell-mouthed feed port 104 is connected to the microwave generator 101 through the waveguide 103. The bell-mouthed feed port 104 is arranged at one end of the waveguide 103. When the bell-mouthed feed port 104 is arranged on an inner layer or a surface layer of the beach face of the uranium tailings pond, the microwave control cabinet 102 controls the microwave generator 101 to output microwave. Then the waveguide 103 transmits the microwave to the bell-mouthed feed port 104 to microwave-sinter and cure uranium tailings on the inner layer or the surface layer of the beach face of the uranium tailings pond.

A shell of the bell-mouthed feed port 104 is provided with an infrared temperature measurement and protection device, a water vapor extraction interface and a waste gas extraction interface. The tail gas treatment system 3 is connected to the waste gas extraction interface through a tube to extract tail gas generated during microwave sintering and curing to the tail gas treatment system 3 for purification. The water vapor extraction interface is connected to a cooling water or circulating water cooling system to cool the microwave system by the cooling water or circulating water cooling system. The infrared temperature measurement and protection device is used to protect a microwave power supply from overheating to prevent the microwave from damaging the power equipment. The protection device includes a circulator and a water load. The protection device is mounted between the microwave generator 101 and the waveguide 103. The circulator in the protection device transmits the microwave generated by the microwave generator to the waveguide 103 in a direction determined by a static bias field. Then the waveguide transmits the microwave to the bell-mouthed feed port for microwave sintering. The water load in the protection device absorbs microwave reflected during microwave heating, thereby achieving overheating protection of the microwave power supply during the heating process.

The microwave generator 101 has an output power of 75-100 KW.

Figure 3:
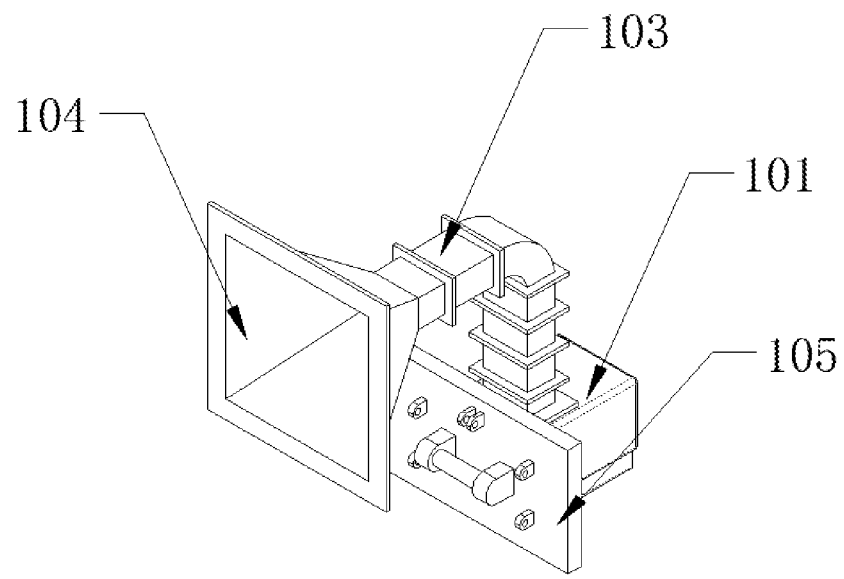
FIG. 3 is a schematic diagram showing a structure and mounting of a bell-mouthed feed port in Embodiment 1 of a microwave curing device for a beach face of a uranium tailings pond according to the present invention.

Referring to FIG. 3, in this embodiment, the microwave heating system 1 is used for surface microwave curing of the beach face of the uranium tailings pond. A bell mouth of the bell-mouthed feed port 104 is rectangular, and the bell mouth has a size of 1 m×1 m to 1 m×2 m.

As shown in FIG. 1, the lifting device 2 is a lifting robot arm which can move freely up and down to adjust the height. The lifting device includes: a lifting arm mounting base 201, a first lifting arm 202, a first cylinder 203, a second lifting arm 204, a second cylinder 205, a third lifting arm 206 and a third cylinder 207. The lifting arm mounting base 201 is horizontally rotatably fixed on the moving device 5. The lifting arm mounting base 201, the first lifting arm 202, the second lifting arm 204 and the third lifting arm 206 are hinged in order. The first cylinder 203 is arranged on a lower side of the first lifting arm 202 and is hinged with the lifting arm mounting base 201 and the first lifting arm 202, respectively. The second cylinder 205 is arranged on a lower side of the first lifting arm 202 and is hinged with the first lifting arm 202 and the second lifting arm 204, respectively. The third cylinder 207 is arranged on an upper side of the second lifting arm 204, and is hinged with the second lifting arm 204 and the third lifting arm 206, respectively. The first cylinder 203, the second cylinder 205 and the first cylinder 203 are used to adjust the lifting of the first lifting arm 202, the second lifting arm 204 and the third lifting arm 206, so as to adjust and control the bell mouth of the bell-mouthed feed port 104 to contact the ground.

The moving device 5 is a crawler type anti-radiation loader, which has a good anti-radiation performance. The crawler type anti-radiation loader is provided with an alarm system, which can automatically alarm in case of an equipment over temperature failure, magnetron over temperature failure and microwave system failure, etc.

The tail gas treatment system 3 uses a water filtration and activated carbon adsorption device.

A metal mesh cover is arranged in a circumferential direction of the bell-mouthed feed port 104, which can effectively prevent microwave leakage.

In this embodiment, the microwave heating system 1 is used to perform surface microwave curing of the beach face of the uranium tailings pond. The microwave heating system 1 is arranged on the moving device 5. The microwave generator 101 and the bell-mouthed feed port 104 are connected through the waveguide 103. The lifting device 2 is moved up and down to position the bell-mouthed feed port 104 above the beach face to be cured, making an edge of the bell-mouthed feed port 104 contact the beach face. The power supply system 4 controls the external power supply to make the microwave generator 101 output 75 k-100 kW of microwave energy. Heating and melting are conducted at a temperature of 1,100-1,500° C. for 30-50 min. During the heating process, the bell-mouthed feed port 104 encloses the entire surface. Tail gas generated during sintering is discharged into the tail gas treatment system 3 through the tail gas extraction interface. After sintering, the moving device 5 and the lifting device 2 move the bell-mouthed feed port 104 to a next sintering surface to repeat the above sintering process. A previous sintering surface is closely connected with a next sintering surface to avoid a gap not sintered between the two sintering surfaces. In this way, the surface of the entire beach face of the uranium tailings pond is completely sintered.

Embodiment 2

Figure 2:
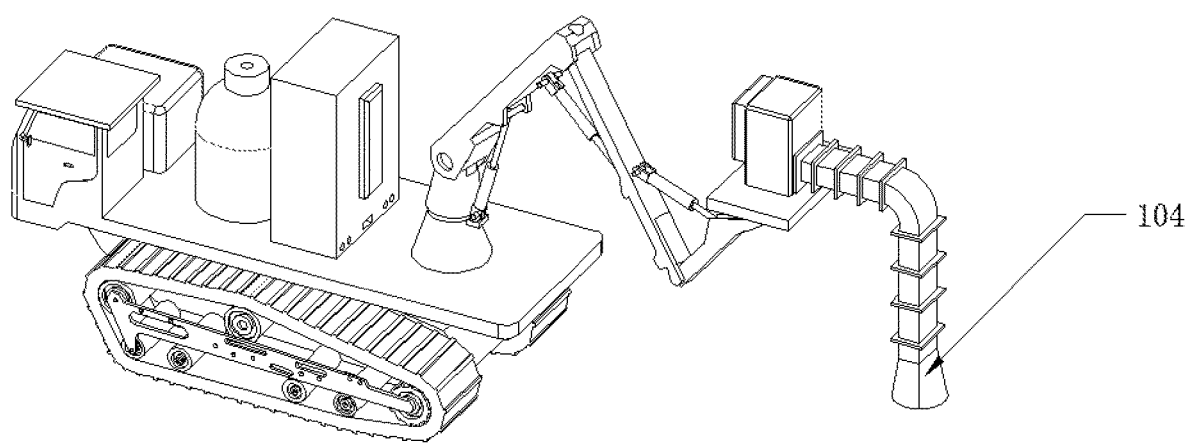
FIG. 2 is a schematic structural diagram of Embodiment 2 of a microwave curing device for a beach face of a uranium tailings pond according to the present invention.
Figure 4:
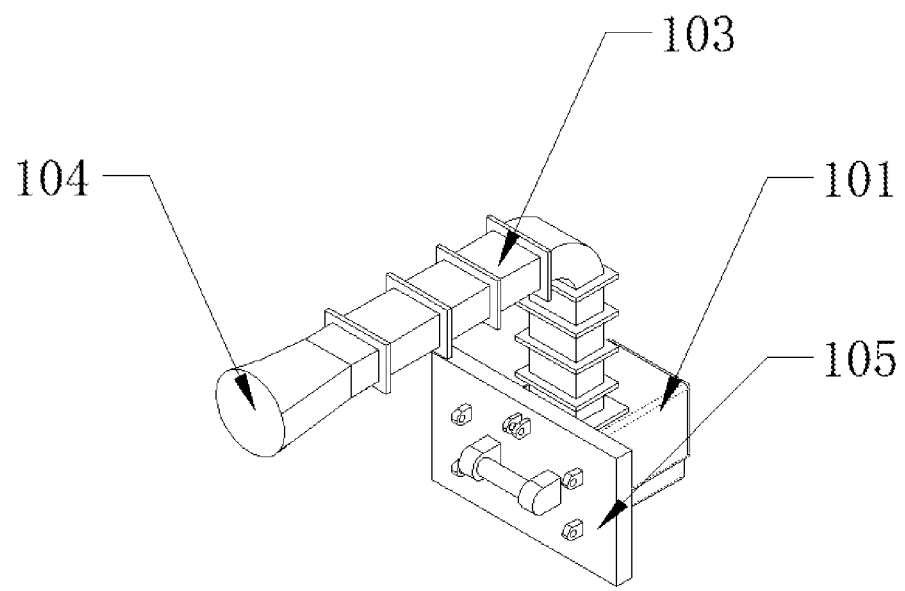
FIG. 4 is a schematic diagram showing a structure and mounting of a bell-mouthed feed port in Embodiment 2 of a microwave curing device for a beach face of a uranium tailings pond according to the present invention.

As shown in FIG. 2, as another implementation of the present invention, this embodiment has a structural principle similar to that of Embodiment 1. This embodiment differs from Embodiment 1 in that, the microwave heating system 1 of this embodiment is used to perform deep microwave curing of the beach face of the uranium tailings pond, and the bell mouth of the bell-mouthed feed port 104 is circular. As shown in FIG. 4, the bell mouth has a diameter of 30-50 cm, and the waveguide is lengthened to realize the deep sintering of the uranium tailings.

A deep microwave heating system is used to perform the deep microwave curing of the beach face of the uranium tailings pond. The bell-mouthed feed port 104 is circular. The working principle of the deep microwave heating system in this embodiment is similar to that in Embodiment 1, except that it is necessary to drill a hole and lay out a point before microwave heating. The lifting device 2 is moved up and down to position the bell-mouthed feed port 104 above a hole needing deep microwave heating. The circular bell-mouthed feed port 104 is inserted into the hole to sinter the deep of the beach face of the uranium tailings pond.

Finally, it should be noted that the above embodiments are merely intended to describe the technical solutions of the present invention, rather than to limit the present invention. Although the present invention is described in detail with reference to the above embodiments, persons of ordinary skill in the art should understand that they may still make modifications to the technical solutions described in the above embodiments or make equivalent replacements to some or all technical features thereof, without departing from the essence of the technical solutions in the embodiments of the present invention.

What is claimed is:

1. A microwave curing device for a beach face of a uranium tailings pond, comprising a microwave heating system (1) for sintering and curing the beach face of the uranium tailings pond at high temperature, wherein the microwave heating system (1) comprises a microwave generator (101), a microwave control cabinet (102), a waveguide (103), a bell-mouthed feed port (104) and a support plate (105); the microwave generator (101) is fixed on the support plate (105) and electrically connected to the microwave control cabinet (102); the bell-mouthed feed port (104) is connected to the microwave generator (101) through the waveguide (103); the bell-mouthed feed port (104) is arranged at one end of the waveguide (103); when the bell-mouthed feed port (104) is arranged on an inner layer or a surface layer of the beach face of the uranium tailings pond, microwave generated by the microwave generator (101) is transmitted to the inner layer or the surface layer of the beach face of the uranium tailings pond through the waveguide (103) to microwave-sinter and cure uranium tailings.

2. The microwave curing device for a beach face of a uranium tailings pond according to claim 1, wherein the device further comprises a lifting device (2), a tail gas treatment system (3), a power supply system (4) and a moving device (5); the microwave heating system (1) is fixedly connected to the lifting device (2) through the support plate (105); the lifting device (2) is rotatably arranged on the moving device (5); the tail gas treatment system (3) and the power supply system (4) are fixed on the moving device (5); the microwave heating system (1), the lifting device (2), the tail gas treatment system (3) and the moving device (5) are all electrically connected to the power supply system (4).

3. The microwave curing device for a beach face of a uranium tailings pond according to claim 1, wherein a shell of the bell-mouthed feed port (104) is provided with an infrared temperature measurement and protection device, a water vapor extraction interface and a waste gas extraction interface; the tail gas treatment system (3) is connected to the waste gas extraction interface through a tube to extract tail gas generated during microwave sintering and curing to the tail gas treatment system (3) for purification; the water vapor extraction interface is connected to a cooling water or circulating water cooling system; the infrared temperature measurement and protection device is mounted between the microwave generator (101) and the waveguide (103).

4. The microwave curing device for a beach face of a uranium tailings pond according to claim 2, wherein the lifting device (2) comprises: a lifting arm mounting base (201), a first lifting arm (202), a first cylinder (203), a second lifting arm (204), a second cylinder (205), a third lifting arm (206) and a third cylinder (207); the lifting arm mounting base (201) is horizontally rotatably fixed on the moving device (5); the lifting arm mounting base (201), the first lifting arm (202), the second lifting arm (204) and the third lifting arm (206) are hinged in order; the first cylinder (203) is arranged on a lower side of the first lifting arm (202) and is hinged with the lifting arm mounting base (201) and the first lifting arm (202), respectively; the second cylinder (205) is arranged on a lower side of the first lifting arm (202) and is hinged with the first lifting arm (202) and the second lifting arm (204), respectively; the third cylinder (207) is arranged on an upper side of the second lifting arm (204), and is hinged with the second lifting arm (204) and the third lifting arm (206), respectively.

5. The microwave curing device for a beach face of a uranium tailings pond according to claim 1, wherein the microwave generator (101) has an output power of 75-100 KW.

6. The microwave curing device for a beach face of a uranium tailings pond according to claim 1, wherein a bell mouth of the bell-mouthed feed port (104) is rectangular, and the bell mouth has a size of 1 m×1 m to 1 m×2 m.

7. The microwave curing device for a beach face of a uranium tailings pond according to claim 1, wherein the bell mouth of the bell-mouthed feed port (104) is circular, and the bell mouth has a diameter of 30-50 cm.

8. The microwave curing device for a beach face of a uranium tailings pond according to claim 2, wherein the moving device (5) is a crawler type anti-radiation loader.

9. The microwave curing device for a beach face of a uranium tailings pond according to claim 2, wherein the tail gas treatment system (3) uses a water filtration and activated carbon adsorption device.

10. The microwave curing device for a beach face of a uranium tailings pond according to claim 2, wherein a metal mesh cover is arranged in a circumferential direction of the bell-mouthed feed port (104).

* * * * *